US012693120B2

(12) United States Patent
Cheng et al.

(10) Patent No.: US 12,693,120 B2
(45) Date of Patent: Jul. 28, 2026

(54) METHOD FOR OBTAINING CONFIDENCE OF MEASUREMENT VALUE BASED ON MULTI-SENSOR FUSION AND AUTONOMOUS VEHICLE

(71) Applicant: BEIJING BAIDU NETCOM SCIENCE TECHNOLOGY CO., LTD., Beijing (CN)

(72) Inventors: Feng Cheng, Beijing (CN); Wenjie Liu, Beijing (CN); Xiaochen Qiu, Beijing (CN); Guoliang Xu, Beijing (CN); Renlan Cai, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 785 days.

(21) Appl. No.: 18/076,942

(22) Filed: Dec. 7, 2022

(65) Prior Publication Data

US 2023/0213343 A1     Jul. 6, 2023

(30) Foreign Application Priority Data

Dec. 8, 2021     (CN) .......................... 202111494323.7

(51) Int. Cl.
   *G01C 21/28*          (2006.01)
(52) U.S. Cl.
   CPC .................................... *G01C 21/28* (2013.01)
(58) Field of Classification Search
   CPC .................................................. G01C 21/28

(Continued)

(56) References Cited

U.S. PATENT DOCUMENTS

| | | | | | |
|---|---|---|---|---|---|
| 4,984,646 | A | * | 1/1991 | Sano | ...................... B62D 5/006 |
| | | | | | 180/402 |
| 2003/0107321 | A1 | * | 6/2003 | Horiuchi | .................. B60Q 1/12 |
| | | | | | 315/81 |

(Continued)

FOREIGN PATENT DOCUMENTS

| | | |
|---|---|---|
| CN | 110979346 A | 4/2020 |
| CN | 112577513 A | 3/2021 |

(Continued)

OTHER PUBLICATIONS

Search Report for Chinese Application No. 2021114943237.

(Continued)

*Primary Examiner* — Oluseye Iwarere
(74) *Attorney, Agent, or Firm* — Lippes Mathias LLP

(57) ABSTRACT

The present disclosure provides a method for obtaining confidence of a measurement value based on multi-sensor fusion and an autonomous vehicle, which includes that: a first measurement value position of a positioning component on a target vehicle is determined at a first moment, and a second measurement value position of the positioning component is determined at a second moment, where the first moment is earlier than the second moment; first distance information is acquired according to the first measurement value position and the second measurement value position; inertial measurement information and wheel speedometer information of the target vehicle from the first moment to the second moment are determined; second distance information is acquired based on the inertial measurement information and the wheel speedometer information; and confidence of a target measurement value corresponding to the second moment is acquired according to the first distance information and the second distance information.

16 Claims, 4 Drawing Sheets

(58) Field of Classification Search
USPC ......................................................... 705/150
See application file for complete search history.

(56) References Cited

U.S. PATENT DOCUMENTS

| | | | | |
|---|---|---|---|---|
| 2018/0172453 A1* | 6/2018 | Weinfield | .............. | G01S 19/396 |
| 2020/0081134 A1* | 3/2020 | Wheeler | .............. | G01S 19/396 |
| 2020/0319351 A1* | 10/2020 | Miyao | .................... | G01C 21/30 |
| 2020/0327696 A1* | 10/2020 | Habib | .................... | G01S 17/86 |
| 2022/0281524 A1* | 9/2022 | Kim | .................... | B62D 15/025 |
| 2023/0367330 A1* | 11/2023 | Morinaga | ............ | G05D 1/0268 |

FOREIGN PATENT DOCUMENTS

| | | | |
|---|---|---|---|
| CN | 112918488 A | 6/2021 | |
| JP | 109877 A | 1/1998 | |
| JP | 2019117124 A | 7/2019 | |
| WO | 2019003623 A1 | 1/2019 | |
| WO | 2019087778 A1 | 5/2019 | |

OTHER PUBLICATIONS

Office Action for Japanese Patent Application No. 2022-196156, dated Sep. 8, 2023, 4 pages.
Obradovic, Dragan et al.; "Fusion of Sensor Data in Siemens Car Navigation System"; IEEE Transactions on Vehicular Technology; vol. 56. No. 1; Jan. 1, 2007; pp. 43-50.
Extended European Search Report for Patent Application No. 22213316.8, dated Apr. 18, 2023, 16 pages.

\* cited by examiner

100

101 Computing unit

102 ROM

103 RAM

104

105 I/O interface

106 Input unit

107 Output unit

108 Storage unit

109 Communication unit

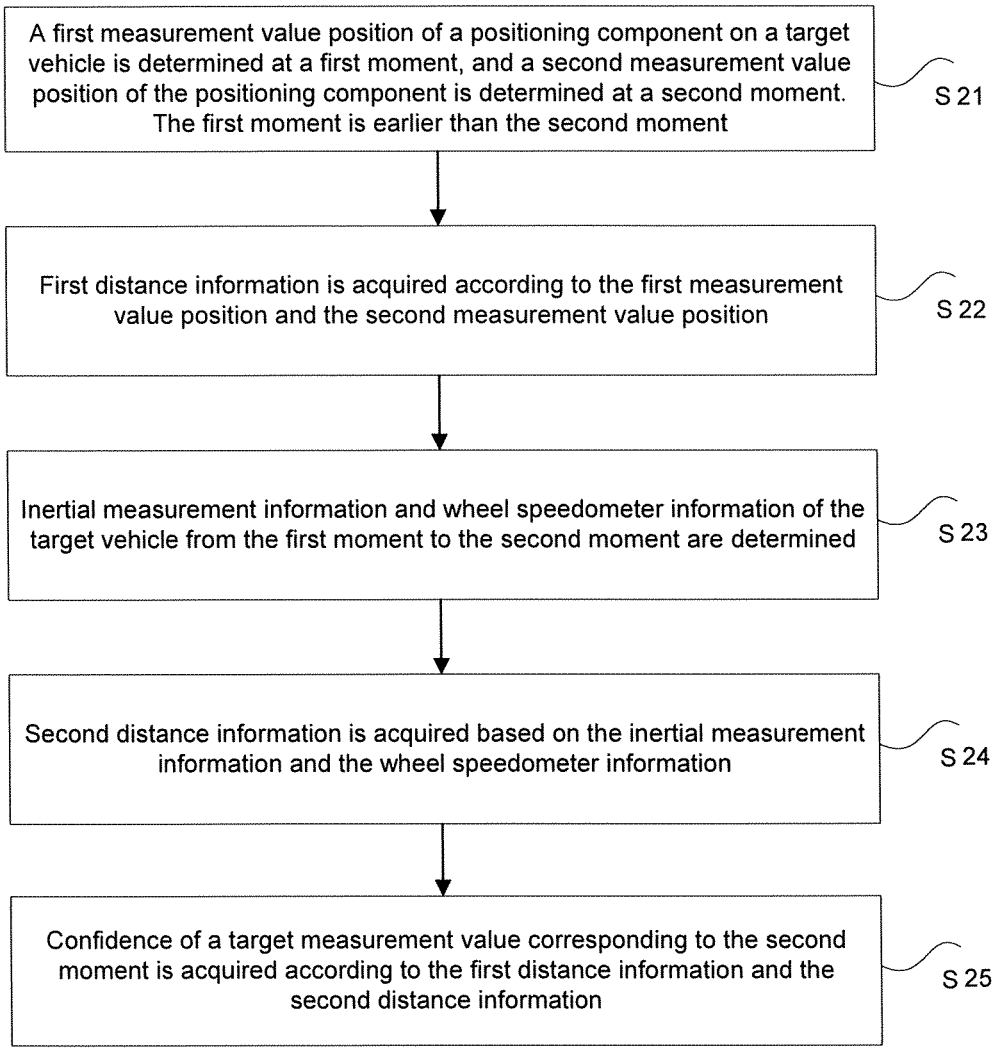

A first measurement value position of a positioning component on a target vehicle is determined at a first moment, and a second measurement value position of the positioning component is determined at a second moment. The first moment is earlier than the second moment — S 21

First distance information is acquired according to the first measurement value position and the second measurement value position — S 22

Inertial measurement information and wheel speedometer information of the target vehicle from the first moment to the second moment are determined — S 23

Second distance information is acquired based on the inertial measurement information and the wheel speedometer information — S 24

Confidence of a target measurement value corresponding to the second moment is acquired according to the first distance information and the second distance information — S 25

Fig. 2

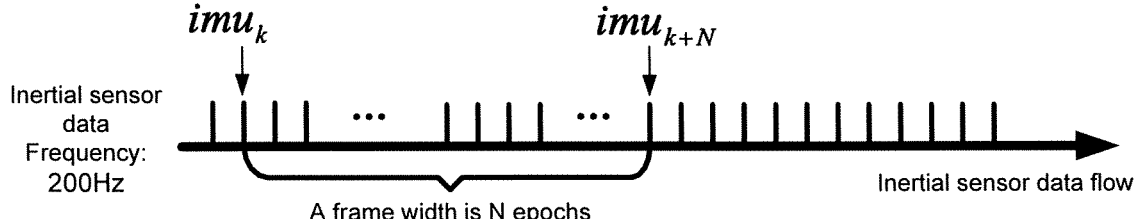

$imu_k$ $imu_{k+N}$

Inertial sensor data Frequency: 200Hz

Inertial sensor data flow

A frame width is N epochs

Fig. 3

Measurement value

Wheel speedometer

Inertial sensor $T_1$ $T_2$

Kalman filter process

Apparatus for obtaining confidence of a measurement value based on multi-sensor fusion 700

First determination module 701

First acquisition module 702

Second determination module 703

Second acquisition module 704

Third acquisition module 705

METHOD FOR OBTAINING CONFIDENCE OF MEASUREMENT VALUE BASED ON MULTI-SENSOR FUSION AND AUTONOMOUS VEHICLE

CROSS-REFERENCE TO RELATED APPLICATIONS

The present disclosure claims priority of Chinese Patent Application No. 202111494323.7, filed to China Patent Office on Dec. 8, 2021. Contents of the present disclosure are hereby incorporated by reference in entirety of the Chinese Patent Application.

TECHNICAL FIELD

The present disclosure relates to the technical field of computers, further relates to the field of an autonomous driving technology, and in particular, to a method for obtaining confidence of a measurement value based on multi-sensor fusion and an autonomous vehicle.

BACKGROUND

During autonomous driving of an unmanned vehicle, a multi-sensor fusion positioning system is required to output continuous high-frequency and precise positioning results in real time, to guarantee the normal operation of modules such as path planning and perception.

In the related art, recursion of Inertial Measurement Units (IMUs) in the positioning system generates accumulation error with long-time operation. In order to obtain a high-precision positioning result, it is required to depend on a Light Detection and Ranging (LiDAR) system and a Global Navigation Satellite System (GNSS) to output an accurate measurement value. When the confidence of the measurement value is inaccurate, the positioning system cannot accurately predict a vehicle state, so that safety risks during autonomous driving are increased.

SUMMARY

At least some embodiments of the present disclosure provide a method for obtaining confidence of a measurement value based on multi-sensor fusion and an autonomous vehicle, so as at least to solve the technical problem of poor positioning effects due to low accuracy of the confidence of the measurement value in the related art.

An embodiment of the present disclosure provides a method for obtaining confidence of a measurement value based on multi-sensor fusion, including: determining a first measurement value position of a positioning component on a target vehicle at a first moment, and determining a second measurement value position of the positioning component at a second moment, where the first moment is earlier than the second moment; acquiring first distance information according to the first measurement value position and the second measurement value position; determining inertial measurement information and wheel speedometer information of the target vehicle from the first moment to the second moment; acquiring second distance information based on the inertial measurement information and the wheel speedometer information; and acquiring confidence of a target measurement value corresponding to the second moment according to the first distance information and the second distance information.

Another embodiment of the present disclosure provides an apparatus for obtaining confidence of a measurement value based on multi-sensor fusion, including: a first determination module, configured to determine a first measurement value position of a positioning component on a target vehicle at a first moment, and determine a second measurement value position of the positioning component at a second moment, where the first moment is earlier than the second moment; a first acquisition module, configured to acquire first distance information according to the first measurement value position and the second measurement value position; a second determination module, configured to determine inertial measurement information and wheel speedometer information of the target vehicle from the first moment to the second moment; a second acquisition module, configured to acquire second distance information based on the inertial measurement information and the wheel speedometer information; and a third acquisition module, configured to acquire confidence of a target measurement value corresponding to the second moment according to the first distance information and the second distance information.

Another embodiment of the present disclosure provides an electronic device, including: at least one processor; and a memory communicatively connected with the at least one processor. The memory is configured to store at least one instruction executable by the at least one processor. The at least one instruction is performed by the at least one processor, to cause the at least one processor to perform the method for obtaining confidence of a measurement value based on multi-sensor fusion provided in the present disclosure.

Another embodiment of the present disclosure provides a non-transitory computer-readable storage medium storing at least one computer instruction. The at least one computer instruction is used for a computer to perform the method for obtaining confidence of a measurement value based on multi-sensor fusion provided in the present disclosure.

Another embodiment of the present disclosure provides a computer program product. The computer program product includes a computer program. The method for obtaining confidence of a measurement value based on multi-sensor fusion provided in the present disclosure is implemented when the computer program is performed by a processor.

Another embodiment of the present disclosure provides an autonomous vehicle. The autonomous vehicle includes the above electronic device.

In the present disclosure, the first measurement value position of the positioning component on the target vehicle is determined at the first moment, and the second measurement value position of the positioning component is determined at the second moment, so that the first distance information is acquired according to the first measurement value position and the second measurement value position. The inertial measurement information and the wheel speedometer information of the target vehicle from the first moment to the second moment are determined, and the second distance information is acquired based on the inertial measurement information and the wheel speedometer information. The confidence of the target measurement value corresponding to the second moment is finally acquired according to the first distance information and the second distance information. In this way, the purpose of acquiring high-precision confidence of the measurement value can be achieved, and effects of enhancing the accuracy of the confidence of the measurement value and obtaining a precise positioning result can be realized. Therefore, the technical problem of poor positioning effects due to low accuracy of the confidence of the measurement value in the related art can be solved.

It should be understood that, the content described in this section is not intended to identify the key or important features of the embodiments of the present disclosure, nor is it intended to limit the scope of the present disclosure. Other features of the present disclosure will become easy to understand through the following description.

BRIEF DESCRIPTION OF THE DRAWINGS

Drawings are used for better understanding the solution, and are not intended to limit the present disclosure.

FIG. 2 is flowchart of a method for obtaining confidence of a measurement value based on multi-sensor fusion according to an embodiment of the present disclosure.

FIG. 3 is a schematic diagram of caching inertial measurement data according to an embodiment of the present disclosure.

DETAILED DESCRIPTION

Figure 1:
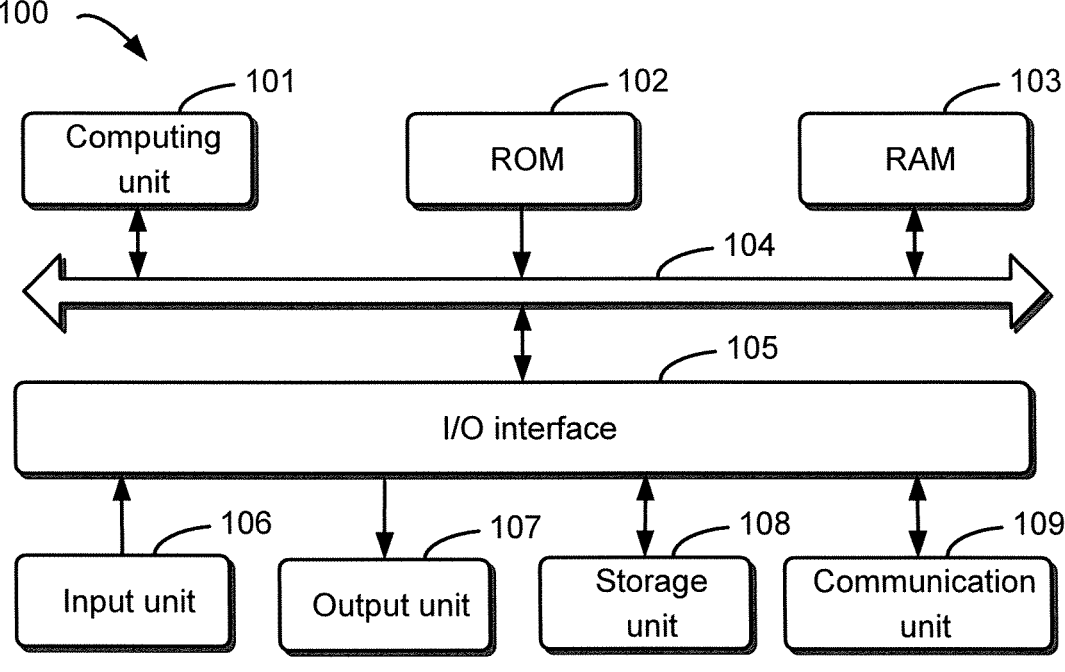
FIG. 1 is a structural block diagram of a hardware structure of a computer terminal (or a mobile device) configured to implement a method for obtaining confidence of a measurement value based on multi-sensor fusion according to an embodiment of the present disclosure.

Exemplary embodiments of the present disclosure are described in detail below with reference to the drawings, including various details of the embodiments of the present disclosure to facilitate understanding, and should be regarded as exemplary. Thus, those of ordinary skilled in the art shall understand that, variations and modifications can be made on the embodiments described herein, without departing from the scope and spirit of the present disclosure. Likewise, for clarity and conciseness, descriptions of well-known functions and structures are omitted in the following description.

It is to be noted that terms "first", "second" and the like in the description, claims and the above mentioned drawings of the present disclosure are used for distinguishing similar objects rather than describing a specific sequence or a precedence order. It should be understood that the data used in such a way may be exchanged where appropriate, in order that the embodiments of the present disclosure described here can be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

A positioning system of an autonomous vehicle is a multi-sensor fusion positioning system. The positioning system output an optimal positioning result by using a Kalman filter fusion IMU, a LiDAR, a GNSS, and a vision module.

IMU recursion generates accumulation error with long-time operation. In order to obtain a high-precision positioning result, it is required to depend on the precision of a measurement value. According to the principle of Kalman filter, in order to obtain an optimal estimation result, the measurement value is required to approach to a truth value as much as possible. In addition, the measurement value is also required to provide the confidence as accurate as possible, so that Kalman filter can fully achieve the effect of the IMU. When there is error in the measurement value provided by the LiDAR, GNSS, or the vision module, the confidence of the measurement value does not match actual error, so that positioning precision is greatly affected, and the positioning system cannot accurately predict vehicle status.

In the related art, a common processing manner to deal with abnormal measurement values received during Kalman filter is a chi-square test. The chi-square test is to count the degree of deviation between an actual observed value of a sample and a theoretical inferred value. The actual observed value is an output result of point cloud positioning, satellite positioning and visual positioning in the positioning system. The theoretical inferred value is a one-step prediction result in time update of the IMU in Kalman filter. The degree of deviation between the actual observed value and the theoretical inferred value may represent the magnitude of a chi-square value. When the chi-square value is larger, the degree of deviation is larger. When the chi-square value is smaller, the degree of deviation is smaller. When the two values are identical, the chi-square value is 0, which indicates that the theoretical inferred value is completely consistent with the actual observed value.

Although the principle of the chi-square test is simple, the correlation between the measurement values is ignored. Specifically, the chi-square test has an obvious effect on the elimination of the abnormal measurement values of a single frame, and may reduce the impact of an abnormal measurement result of the frame on fusion filter, so that positioning results are not affected by individual abnormal measurement values. However, for error trends and a measurement value that the confidence of the measurement value is inconsistent with a real situation, for example, the LiDAR measurement value in a tunnel may drift slowly over time in the tunnel, and there is errors in the outputted measurement value for a long time due to fixed errors in the GNSS, a positioning result outputted through filtering gradually biases to a wrong measurement result, resulting in positioning drift. In addition, the confidence of fusion positioning cannot objectively express a current positioning error and give corresponding prediction, so that safety risks during autonomous driving are increased.

Therefore, there is a technical problem of poor positioning effects due to low accuracy of the confidence of the measurement value in the related art.

An embodiment of the present disclosure provides a method for obtaining confidence of a measurement value based on multi-sensor fusion. It is to be noted that steps shown in the flowcharts of the drawings may be executed in a computer system, such as a set of computer-executable instructions, and although a logical sequence is shown in the flowcharts, in some cases, the steps shown or described may be executed in a different order than here.

The method embodiment provided in this embodiment of the present disclosure may be performed in a mobile terminal, a computer terminal, or a similar electronic device. The electronic device is intended to represent various forms of digital computers, such as laptop computers, desktop computers, workbenches, personal digital assistants, servers, blade servers, mainframe computers, and other suitable computers. The electronic device may also express various forms of mobile devices, such as personal digital processing, cellular phones, smart phones, wearable devices, and other similar computing devices. The components shown herein, connections and relationships of the components, and functions of the components are examples, and are not intended to limit the implementation of the present disclosure described and/or required herein. FIG. 1 is a block diagram of a hardware structure of a computer terminal (or a mobile device) configured to implement a method for obtaining confidence of a measurement value based on multi-sensor fusion according to an embodiment of the present disclosure.

As shown in FIG. 1, the computer terminal 100 includes a computing unit 101. The computing unit may perform various appropriate actions and processing operations according to a computer program stored in a Read-Only Memory (ROM) 102 or a computer program loaded from a storage unit 108 into a Random Access Memory (RAM) 103. In the RAM 103, various programs and data required for the operation of the computer terminal 100 may also be stored. The computing unit 101, the ROM 102, and the RAM 103 are connected with each other by using a bus 104. An Input or Output (I/O) interface 105 is also connected with the bus 104.

Multiple components in the computer terminal 100 are connected with the I/O interface 105, and include: an input unit 106, such as a keyboard and a mouse; an output unit 107, such as various types of displays and loudspeakers; the storage unit 108, such as a disk and an optical disc; and a communication unit 109, such as a network card, a modem, and a wireless communication transceiver. The communication unit 109 allows the computer terminal 100 to exchange information or data with other devices through a computer network, such as the Internet, and/or various telecommunication networks.

The computing unit 101 may be various general and/or special processing assemblies with processing and computing capabilities. Some examples of the computing unit 101 include, but are not limited to, a Central Processing Unit (CPU), a Graphics Processing Unit (GPU), various dedicated Artificial Intelligence (AI) computing chips, various computing units for running machine learning model algorithms, a Digital Signal Processor (DSP), and any appropriate processors, controllers, microcontrollers, and the like. The computing unit 101 performs the method for obtaining confidence of a measurement value based on multi-sensor fusion described herein. For example, in some embodiments, the method for obtaining confidence of a measurement value based on multi-sensor fusion may be implemented as a computer software program, which is tangibly included in a machine-readable medium, such as the storage unit 108. In some embodiments, part or all of the computer program may be loaded and/or installed on the computer terminal 100 via the ROM 102 and/or the communication unit 109. When the computer program is loaded into the RAM 103 and performed by the computing unit 101, at least one step of the method for obtaining confidence of a measurement value based on multi-sensor fusion described herein may be performed. Alternatively, in other embodiments, the computing unit 101 may be configured to perform the method for obtaining confidence of a measurement value based on multi-sensor fusion in any other suitable manners (for example, according to firmware).

Various implementations of systems and technologies described here may be implemented in a digital electronic circuit system, an integrated circuit system, a Field Programmable Gate Array (FPGA), an Application-Specific Integrated Circuit (ASIC), an Application-Specific Standard Product (ASSP), a System-On-Chip (SOC), a Load Programmable Logic Device (CPLD), computer hardware, firmware, software, and/or a combination thereof. These various implementations may include: being implemented in at least one computer program, the at least one computer program may be performed and/or interpreted on a programmable system including at least one programmable processor. The programmable processor may be a dedicated or general programmable processor, which can receive data and instructions from a storage system, at least one input device, and at least one output device, and transmit the data and instructions to the storage system, the at least one input device, and the at least one output device.

It is to be noted herein that, in some optional embodiments, the electronic device shown in FIG. 1 may include a hardware element (including a circuit), a software element (including a computer code stored on the computer-readable medium), or a combination of the hardware element and the software element. It should be noted that, FIG. 1 is an example of a specific example, and is intended to illustrate the types of components that may be present in the above electronic device.

Under the above operation environment, the present disclosure provides the method for obtaining confidence of a measurement value based on multi-sensor fusion shown in FIG. 2. The method may be performed by the computer terminal shown in FIG. 1 or a similar electronic device. FIG. 2 is flowchart of a method for obtaining confidence of a measurement value based on multi-sensor fusion according to an embodiment of the present disclosure. As shown in FIG. 2, the method may include the following steps.

At step S21, a first measurement value position of a positioning component on a target vehicle is determined at a first moment, and a second measurement value position of the positioning component is determined at a second moment. The first moment is earlier than the second moment.

The positioning component includes any one of a LiDAR, a GNSS, and a vision module in a target vehicle positioning system.

The first measurement value position and the second measurement value position may be expressed by using Universal Transverse Mercator Grid System (UTM) coordinates. The UTM coordinates are plane rectangular coordinates. This coordinate grid system and projections on which this coordinate grid system is based may be widely applied to topographic maps, and used as other applications of reference grids of a satellite image and a natural resource database precisely positioned based on requirements.

At step S22, first distance information is acquired according to the first measurement value position and the second measurement value position.

Specifically, for an implementation process of acquiring the first distance information according to the first measurement value position and the second measurement value position, refer to further instruction of this embodiment of the present disclosure, which is not described again.

At step S23, inertial measurement information and wheel speedometer information of the target vehicle from the first moment to the second moment are determined.

The inertial measurement information and the wheel speedometer information may be automatically cached by the positioning component. For example, when the Kalman filter is positioned to converge, and the positioning is initialized, the positioning component continues to cache IMU information and the wheel speedometer information for about 2 seconds.

At step S24, second distance information is acquired based on the inertial measurement information and the wheel speedometer information.

Specifically, for an implementation process of acquiring the second distance information according to the inertial measurement information and the wheel speedometer information, refer to further instruction of this embodiment of the present disclosure.

At step S25, confidence of a target measurement value corresponding to the second moment is acquired according to the first distance information and the second distance information.

According to S21 to S25 in the present disclosure, the first measurement value position of the positioning component on the target vehicle is determined at the first moment, and the second measurement value position of the positioning component is determined at the second moment, so that the first distance information is acquired according to the first measurement value position and the second measurement value position. The inertial measurement information and the wheel speedometer information of the target vehicle from the first moment to the second moment are determined, and the second distance information is acquired based on the inertial measurement information and the wheel speedometer information. The confidence of the target measurement value corresponding to the second moment is finally acquired according to the first distance information and the second distance information. In this way, the purpose of acquiring high-precision confidence of the measurement value can be achieved, and effects of enhancing the accuracy of the confidence of the measurement value and obtaining a precise positioning result can be realized. Therefore, the technical problem of poor positioning effects due to low accuracy of the confidence of the measurement value in the related art can be solved.

The method for obtaining confidence of a measurement value based on multi-sensor fusion in the above embodiment is further introduced below.

As an optional implementation, the step S22 of acquiring the first distance information according to the first measurement value position and the second measurement value position includes the following steps.

At step S221, first coordinate data of the first measurement value position in a target rectangular plane coordinate system is determined.

The target rectangular plane coordinate system is a UTM coordinate system.

At step S222, second coordinate data of the second measurement value position in the target rectangular plane coordinate system is determined.

At step S223, a horizontal Euclidean distance between the second measurement value position and the first measurement value position is calculated according to the first coordinate data and the second coordinate data, to obtain the first distance information.

For example, the first coordinate data of the first measurement value position $P_{T_1}$ at a moment $T_1$ in the UTM coordinate system may be expressed by using the following formula (1).

$$P_{T_1} = \begin{bmatrix} p_x^{T_1} & p_y^{T_1} & p_z^{T_1} \end{bmatrix}^T \qquad \text{Formula (1)}$$

The second coordinate data of the second measurement value position $P_{T_2}$ at a moment $T_2$ in the UTM coordinate system may be expressed by using the following formula (2).

$$P_{T_2} = \begin{bmatrix} p_x^{T_2} & p_y^{T_2} & p_z^{T_2} \end{bmatrix}^T \qquad \text{Formula (2)}$$

The horizontal Euclidean distance between the second measurement value position $P_{T_2}$ and the first measurement value position $P_T$ is calculated according to the first coordinate data and the second coordinate data by using the following formula (3), to obtain the first distance information $\Delta p_{T_2 T_1}$.

$$\Delta p_{T_2 T_1} = \qquad\qquad\qquad \text{Formula (3)}$$
$$\sqrt{\left(p_x^{T_2} - p_x^{T_1}\right) \cdot \left(p_x^{T_2} - p_x^{T_1}\right) + \left(p_y^{T_2} - p_y^{T_1}\right) \cdot \left(p_y^{T_2} - p_y^{T_1}\right)}$$

In the above optional embodiment, the horizontal Euclidean distance between the second measurement value position and the first measurement value position is calculated according to the first coordinate data and the second coordinate data, to obtain the first distance information, so as to calculate the confidence of the target measurement value corresponding to the second moment.

As an optional implementation, a frame width between the first moment and the second moment includes multiple epochs. The step S24 of acquiring the second distance information based on the inertial measurement information and the wheel speedometer information includes the following steps.

At step S241, attitude update information corresponding to the multiple epochs is determined according to the inertial measurement information.

Specifically, for an implementation process of determining the attitude update information corresponding to the multiple epochs according to the inertial measurement information, refer to the further instruction of the following embodiments, which is not described again.

At step S242, speed update information corresponding to the multiple epochs is determined based on the wheel speedometer information and the attitude update information.

Specifically, for an implementation process of determining the speed update information corresponding to the multiple epochs based on the wheel speedometer information and the attitude update information, refer to the further instruction of the following embodiments, which is not described again.

At step S243, relative displacement from the first moment to the second moment is determined according to the speed update information.

At step S244, second distance information is acquired according to the relative displacement.

In the above optional embodiment, the attitude update information corresponding to the multiple epochs is determined according to the inertial measurement information. The speed update information corresponding to the multiple epochs is determined based on the wheel speedometer information and the attitude update information. Then, the relative displacement from the first moment to the second moment is determined according to the speed update information. Finally, the second distance information is acquired according to the relative displacement, to calculate the confidence of the target measurement value corresponding to the second moment.

As an optional implementation, the step S241 of determining the attitude update information corresponding to the multiple epochs according to the inertial measurement information includes the following steps.

At step S2411, for every adjacent first epoch and second epoch in the multiple epochs, first inertial measurement data corresponding to the first epoch and second inertial measurement data corresponding to the second epoch are respectively determined in order according to the inertial measurement information.

At step S2412, a first angle increment is determined based on the first inertial measurement data, and a second angle increment is determined based on the second inertial measurement data.

At step S2413, the attitude update information corresponding to the multiple epochs is determined according to the first angle increment and the second angle increment.

For example, FIG. 3 is a schematic diagram of caching inertial measurement data according to an embodiment of the present disclosure. As shown in FIG. 3, the frequency of IMU data is 200 Hz.

The frame width between the first moment $T_1$ and the second moment $T_2$ includes N epochs. The IMU data corresponding to the epoch where the first moment $T_1$ is located is $imu_k$, and the IMU data corresponding to the epoch where the second moment $T_2$ is located is $imu_{k+N}$. For the adjacent first epoch and second epoch between $T_1$ and $T_2$, the first inertial measurement data $$\omega_{ib}^b(k)$$

corresponding to the first epoch and the second inertial measurement data $$\omega_{ib}^b(k+1)$$

corresponding to the second epoch are respectively determined in order according to the inertial measurement information. The first angle increment $\Delta\theta_k$ at a moment k is determined based on the first inertial measurement data $$\omega_{ib}^b(k)$$

by using the following formula (4).

$$\Delta\theta_k = \omega_{ib}^b(k)\Delta t \qquad \text{Formula (4)}$$

The second angle increment $\Delta\theta_{k+1}$ at a moment (k+1) is determined based on the second inertial measurement data $$\omega_{ib}^b(k+1)$$

by using the following formula (5).

$$\Delta\theta_{k+1} = \omega_{ib}^b(k+1)\Delta t \qquad \text{Formula (5)}$$

Attitude quaternion $$q_{b_{k+1}}^{b_k}$$

of the moment k+1 relative to the moment k is calculated according to the first angle increment $\Delta\theta_k$ and the second angle increment $\Delta\theta_{k+1}$ by using the following formula (6), a formula (7), and a formula (8).

$$q_{b_{k+1}}^{b_k} = q_{b_k}^{b_k} \otimes q_{b_{k+1}}^{b_k} \qquad \text{Formula (6)}$$

$\otimes$ represents a quaternion operator.

$$q_{b_{k+1}}^{b_k} = \begin{bmatrix} \cos\|0.5\phi_{k+1}\| \\ \dfrac{\sin\|0.5\phi_{k+1}\|}{\|0.5\phi_{k+1}\|}0.5\phi_{k+1} \end{bmatrix} \qquad \text{Formula (7)}$$

$$\phi_{k+1} \approx \Delta\theta_{k+1} + \frac{1}{12}\Delta\theta_k \times \Delta\theta_{k+1} \qquad \text{Formula (8)}$$

Further, attitude quaternion $$q_{b_{k+2}}^{b_k}$$

of the moment k+2 relative to the moment k is calculated according to the following formula (9).

$$q_{b_{k+2}}^{b_k} = q_{b_{k+1}}^{b_k} \otimes q_{b_{k+2}}^{b_{k+1}} \qquad \text{Formula (9)}$$

And so on, the attitude update information corresponding to the multiple epochs between the first moment and the second moment may be determined.

In the above optional embodiment, for every adjacent first epoch and second epoch in the multiple epochs, the first inertial measurement data corresponding to the first epoch and the second inertial measurement data corresponding to the second epoch are respectively determined in order according to the inertial measurement information. Then the first angle increment and the second angle increment are determined. Finally, the attitude update information corresponding to the multiple epochs is determined, to subsequently determine the speed update information corresponding to the multiple epochs.

As an optional implementation, the step S242 of determining the speed update information corresponding to the multiple epochs based on the wheel speedometer information and the attitude update information includes the following steps.

At step S2421, first wheel speedometer data corresponding to the first moment is acquired.

At step S2422, a steering angle of the target vehicle is calculated based on the first wheel speedometer data.

Specifically, for an implementation process of calculating the steering angle of the target vehicle based on the first wheel speedometer data, refer to the further instruction of the following embodiments, which is not described again.

At step S2423, second wheel speedometer data is acquired according to the steering angle, and the second wheel speedometer data is wheel speedometer data corresponding to the first wheel speedometer data in a vehicle body coordinate system.

At step S2424, mounting angle data between a vehicle body of the target vehicle and an IMU arranged on the target vehicle is obtained according to conversion of the attitude update information.

The mounting angle data is an included angle that is formed by the mounting error of the IMU on the target vehicle.

At step S2425, third wheel speedometer data is calculated according to the second wheel speedometer data and the mounting angle data, and the third wheel speedometer data is wheel speedometer data in a carrier inertial system.

At step S2426, fourth wheel speedometer data is calculated according to wheel speedometer lever-arm error data and the third wheel speedometer data, and the fourth wheel speedometer data is wheel speedometer data in an IMU coordinate system.

In the above optional embodiment, the speed update information corresponding to the multiple epochs may be determined based on the wheel speedometer information and the attitude update information, to determine the relative displacement from the first moment to the second moment, thereby acquiring the second distance information.

As an optional implementation, the first wheel speedometer data includes front left wheel speed, front right wheel speed, rear left wheel speed, and rear right wheel speed. The step S2422 of calculating the steering angle based on the first wheel speedometer data includes the following steps.

At step S31, virtual front wheel speed of the target vehicle is calculated according to the front left wheel speed and the front right wheel speed.

At step S32, turning angle speed of the target vehicle is calculated according to the rear left wheel speed, the rear right wheel speed, and a tread between a rear left wheel and a rear right wheel of the target vehicle.

At step S33, a turning radius of the target vehicle is calculated according to the virtual front wheel speed and the turning angle speed.

At step S34, the steering angle is calculated according to the turning radius and a wheelbase between a front wheel and a rear wheel of the target vehicle.

In the above optional embodiment, the steering angle may be calculated based on the front left wheel speed, the front right wheel speed, the rear left wheel speed, and the rear right wheel speed in the first wheel speedometer data.

For example, the first wheel speedometer data $V_{wheel}$ corresponding to the first moment $T_1$ is acquired, and $V_{wheel}$ may be expressed by using the following formula (10).

$$V_{wheel} = [V_{front\ left}\ V_{front\ right}\ V_{rear\ left}\ V_{rear\ right}] \qquad \text{Formula (10)}$$

$V_{front\ left}$ is the speed of a front left wheel of the target vehicle. $V_{front\ right}$ is the speed of a front right wheel of the target vehicle. $V_{rear\ left}$ is the speed of a rear left wheel of the target vehicle. $V_{rear\ right}$ is the speed of a rear right wheel of the target vehicle.

Figure 4:
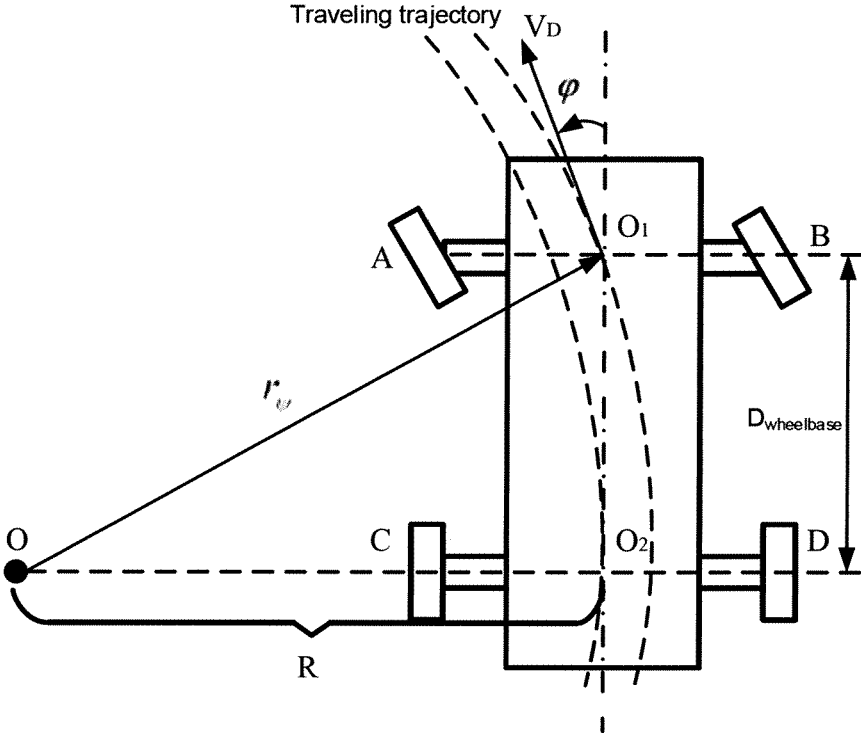
FIG. 4 is a schematic diagram of a vehicle wheel speedometer turning model according to an embodiment of the present disclosure.

FIG. 4 is a schematic diagram of a target vehicle wheel speedometer turning model according to an embodiment of the present disclosure. As shown in FIG. 4, A is the front left wheel of the target vehicle, B is the front right wheel of the target vehicle, C is the rear left wheel of the target vehicle, and D is the rear right wheel of the target vehicle. The speed of a center point $O_1$ between A and B is virtual front wheel speed $V_D$ of the target vehicle. The virtual front wheel speed $V_D$ of the target vehicle is calculated according to the front left wheel speed and the front right wheel speed by using the following formula (11).

$$V_D \approx \frac{V_{front\ left} + V_{front\ right}}{2} \qquad \text{Formula (11)}$$

The turning angle speed $\omega$ of the target vehicle is calculated according to the rear left wheel speed, the rear right wheel speed, and the tread between the rear left wheel and the rear right wheel of the target vehicle by using the following formula (12).

$$\omega = \frac{V_{rear\ right} + V_{rear\ left}}{l_{tread}} \qquad \text{Formula (12)}$$

$l_{tread}$ is the tread between the rear left wheel and the rear right wheel of the target vehicle.

The turning radius R of the target vehicle is calculated according to the virtual front wheel speed and the turning angle speed by using the following formula (13).

$$R = \frac{V_D}{\omega} \qquad \text{Formula (13)}$$

The steering angle $\varphi$ is calculated according to the turning radius and a wheelbase between the front wheel and the rear wheel of the target vehicle by using the following formula (14).

$$\varphi = \angle O_1 O O_2 = \arcsin\frac{D_{wheelbase}}{R} \qquad \text{Formula (14)}$$

$D_{wheel\ base}$ is the wheelbase between the front wheel and the rear wheel of the target vehicle.

According to the steering angle, second wheel speedometer data $$V_{wheel}^v$$

is acquired by using the following formula (15).

$$V_{wheel}^v = [V_D \sin\varphi\ V_D \cos\varphi\ 0] \qquad \text{Formula (15)}$$

The mounting angle data $$C_b^{b_{k+1}}$$

between the vehicle body of the target vehicle and the IMU arranged on the target vehicle is obtained according to conversion of the attitude update information $$q_{b_{k+1}}^{b_k}.$$

Third wheel speedometer data $$V_{wheel}^{b_{k+1}}$$

of the moment k+1 relative to the moment k in a carrier inertial system is calculated according to the second wheel speedometer data and the mounting angle data by using the following formula (16).

$$V_{wheel}^{b_{k+1}} = C_b^{b_{k+1}} C_v^b V_{wheel}^v \qquad \text{Formula (16)}$$

$$C_v^b$$

is a mounting angle between the vehicle body of the target vehicle and the IMU, which is formed due to mounting error.

Figure 5:
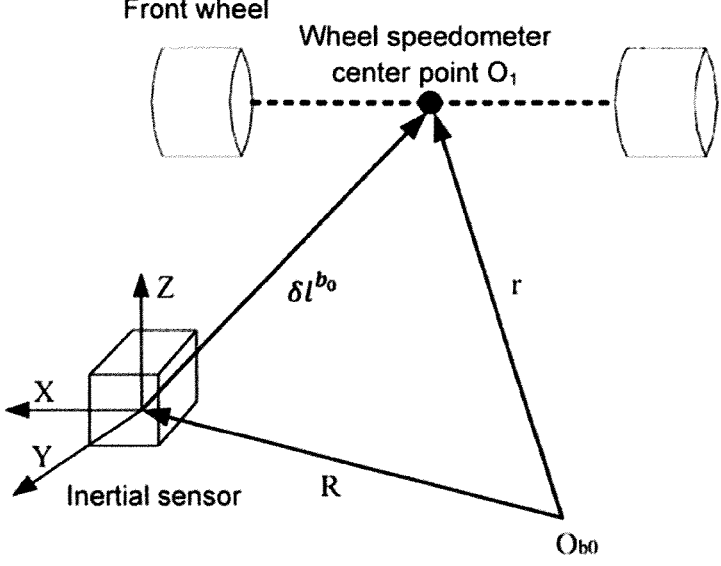
FIG. 5 is a schematic measurement diagram of an Inertial Measurement Unit (IMU) according to an embodiment of the present disclosure.

Further, since the IMU is mounted on the vehicle body, as shown in FIG. 5, a measurement center $O_{b0}$ of the IMU is inconsistent with a point $O_1$ measured by a wheel speedometer. Therefore, lever arm compensation is required, to obtain the speed of the measurement center of the IMU. Since a horizontal attitude angle of the target vehicle is generally not large during traveling, the impact on a lever arm in a height direction may be ignored. Wheel speedometer lever-arm error data $\Delta l^b$ may be expressed by using the following formula (17).

$$\Delta l^b = [dx \ dy \ 0]^T \qquad \text{Formula (17)}$$

Fourth wheel speedometer data $$V_{imu}^{b_{k+1}}$$

is calculated according to the wheel speedometer lever-arm error data $\Delta l^b$ and the third wheel speedometer data $$V_{wheel}^{b_{k+1}}$$

by using the following formula (18), and the fourth wheel speedometer data $$V_{imu}^{b_{k+1}}$$

is wheel speedometer data of the moment k+1 relative to the moment k in an IMU coordinate system.

$$V_{imu}^{b_{k+1}} = V_{wheel}^{b_{k+1}} - C_b^{b_{k+1}} (\Delta\theta_{k+1} \times) \Delta l^b \qquad \text{Formula (18)}$$

$\Delta\theta_{k+1} \times$ represents a multiplication cross symbol of IMU gyro angular speed at the moment k+1.

As an optional implementation, the step S243 of determining the relative displacement from the first moment to the second moment according to the speed update information includes the following steps. The relative displacement is obtained through recursion according to the fourth wheel speedometer data corresponding to every two adjacent epochs in the multiple epochs.

As an optional implementation, the step S244 of acquiring the second distance information according to the relative displacement includes the following steps. A horizontal Euclidean distance is calculated based on the relative displacement, to obtain the second distance information.

For example, the fourth wheel speedometer data $$V_{imu}^{b_{k+1}}$$

may be configured to obtain the relative displacement $$\Delta P_k^{b_{k+1}}$$

of the moment k+1 relative to the moment k by using the following formula (19).

$$\Delta P_k^{k+1} = V_{imu}^{b_{k+1}} \Delta t \qquad \text{Formula (19)}$$

It is recursive to moments k+N in order by using the above formula (19), that is, the second moment $T_2$, so that the relative displacement $$\Delta P_{T_1}^{T_2}$$

from the first moment $T_1$ to the second moment $T_2$ is calculated by using the following formula (20).

$$\Delta P_{T_1}^{T_2} = \Delta P_k^{k+N} = \Delta P_k^{k+1} + \Delta P_{k+1}^{k+2} + \ldots + \Delta P_{k+N-1}^{k+N} \qquad \text{Formula (20)}$$

The horizontal Euclidean distance $$\Delta p_{T_2 T_1}^b$$

is obtained according to the first two items of the relative displacement $$\Delta P_{T_1}^{T_2} = \left[ \Delta p_x^b \Delta p_y^b \Delta p_z^b \right],$$

to obtain the second distance information. The horizontal Euclidean distance $$\Delta p_{T_2 T_1}^b$$

is expressed by using the following formula (21).

$$\Delta p_{T_2 T_1}^b = \sqrt{\Delta p_x^b \cdot \Delta p_x^b + \Delta p_y^b \cdot \Delta p_y^b} \qquad \text{Formula (21)}$$

As an optional implementation, the step S25 of acquiring the confidence of the target measurement value according to the first distance information and the second distance information includes the following steps.

At step S251, a confidence adjustment coefficient of a measurement value is determined according to the first distance information, the second distance information, and the confidence of an initial measurement value corresponding to the second moment.

At step S252, the confidence of the target measurement value is acquired according to the confidence adjustment coefficient of the measurement value and the confidence of the initial measurement value.

For example, the confidence of the initial measurement value corresponding to the second moment $T_2$ is a standard deviation of the measurement value. A confidence matrix $R^{T_2}$ of the initial measurement value is expressed by using the formula (22).

$$R^{T_2} = \text{diag}(R_x \, R_y \, R_z) \qquad \text{Formula (22)}$$

The confidence adjustment coefficient $\varepsilon$ of the measurement value is determined according to the first distance information $\Delta p_{T_2 T_1}$, the second distance information $$\Delta p_{T_2 T_1}^b,$$

and the confidence matrix $R^{T_2}$ of the initial measurement value corresponding to the second moment. A specific determination rule is shown as the following formula (23).

$$\begin{cases} \text{If } \left| \Delta p_{T_2 T_1}^b - \Delta p_{T_2 T_1} \right| \le 3\sqrt{R_x \cdot R_x + R_y \cdot R_y}, \varepsilon = 1 & \text{Formula (23)} \\ \text{If } \left| \Delta p_{T_2 T_1}^b - \Delta p_{T_2 T_1} \right| > 3\sqrt{R_x \cdot R_x + R_y \cdot R_y}, \varepsilon = \vartheta \dfrac{\Delta p_{T_2 T_1}^b}{\Delta p_{T_2 T_1}} \end{cases}$$

$\vartheta$ is an amplification coefficient, different measurement module characteristics correspond to different amplification coefficients.

Based on the confidence adjustment coefficient $\varepsilon$ of the measurement value and the confidence $R^{T_2}$ of the initial measurement value, the confidence $R^{T_2}(\text{new})$ of the target measurement value of the second moment $T_2$ is acquired by using the formula (24).

$$R^{T_2}(\text{new}) = \varepsilon \cdot \varepsilon \cdot \text{diag}(R_x \, R_y \, R_z) \qquad \text{Formula (24)}$$

Figure 6:
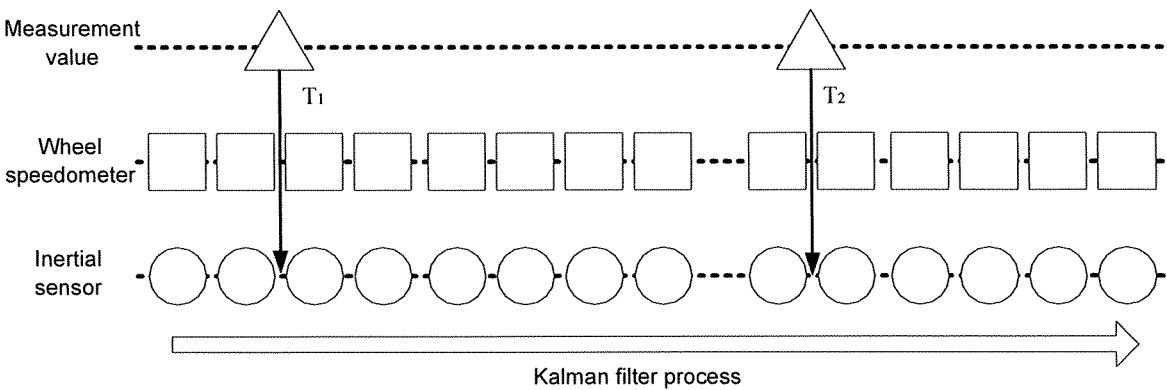
FIG. 6 is a schematic diagram of an overall framework of fusion positioning according to an embodiment of the present disclosure.

FIG. 6 is a schematic diagram of an overall framework of fusion positioning according to an embodiment of the present disclosure. The measurement value of the second moment $T_2$ and the confidence of the target measurement value are substituted into Kalman filter for measurement update to obtain an updated positioning result.

In the above optional embodiment, the confidence adjustment coefficient of the measurement value may be determined according to the first distance information, the second distance information, and the confidence of the initial measurement value corresponding to the second moment. Then, the accurate confidence of the target measurement value is acquired according to the confidence adjustment coefficient of the measurement value and the confidence of the initial measurement value. Therefore, a high-precision positioning result can be acquired, and safety risks during autonomous driving can be reduced.

According to the method for obtaining confidence of a measurement value based on multi-sensor fusion provided in this embodiment of the present disclosure, the advantages of IMU combined with wheel speedometer with high recursive precision in the short term are considered, a same module is taken to output two frames of adjacent measurement values, so that the first distance information and the second distance information are calculated. The confidence of the target measurement value corresponding to the second moment is acquired according to the first distance information and the second distance information, to evaluate the quality of a measurement result of a current frame of the module. Therefore, positioning precision can be effectively enhanced. In addition, a position weight in Kalman filter can further accurately reflect the real precision level of the current moment, which is consistent with actual error, so that a positioning apparatus may predict the confidence of the positioning more accurately, and an alarm is timely sounded and autonomous driving is quit when the positioning ability does not meet requirements, thereby improving the safety of the autonomous driving of vehicles.

In the technical solution of the present disclosure, the involved processing such as acquisition, storage, application, processing, transmission, providing, and disclosure of personal information of the user are in compliance with relevant laws and regulations, and does not violate public order and good customs.

From the above descriptions about the implementation modes, those skilled in the art may clearly know that the method according to the foregoing embodiments may be implemented in a manner of combining software and a necessary universal hardware platform, and of course, may also be implemented through hardware, but the former is a preferred implementation mode under many circumstances. Based on such an understanding, the technical solutions of the present disclosure substantially or parts making contributions to the conventional art may be embodied in form of a software product, and the computer software product is stored in a storage medium, including multiple instructions for causing a terminal device (which may be a mobile phone, a computer, a server, a network device or the like) to execute the method in each embodiment of the present disclosure.

Another embodiment of the present disclosure further provides an apparatus for obtaining confidence of a measurement value based on multi-sensor fusion. The apparatus is configured to implement the above embodiments and exemplary implementations, and what has been described will not be described again. As used below, the term "module" may be a combination of software and/or hardware that implements a predetermined function. Although the apparatus described in the following embodiments is preferably implemented in software, but implementations in hardware, or a combination of software and hardware, are also possible and conceived.

Figure 7:
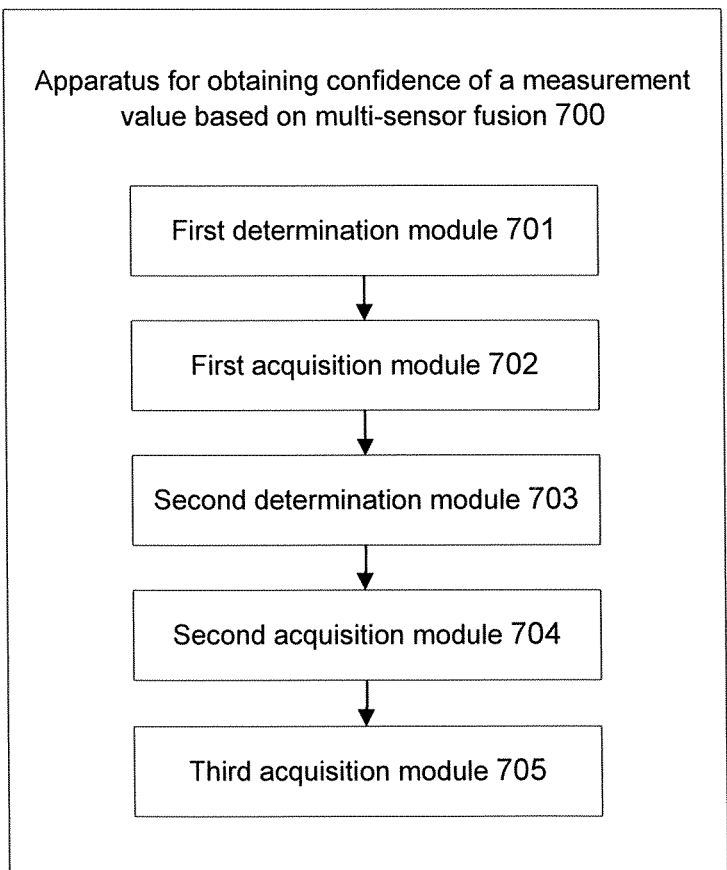
FIG. 7 is structural block diagram of an apparatus for obtaining confidence of a measurement value based on multi-sensor fusion according to an embodiment of the present disclosure.

FIG. 7 is structural block diagram of an apparatus for obtaining confidence of a measurement value based on multi-sensor fusion according to one of embodiments of the present disclosure. As shown in FIG. 7, the apparatus 700 for obtaining confidence of a measurement value based on multi-sensor fusion includes a first determination module, a first acquisition module, a second determination module, a second acquisition module, and a third acquisition module.

The first determination module 701 is configured to determine a first measurement value position of a positioning component on a target vehicle at a first moment, and determine a second measurement value position of the positioning component at a second moment. The first moment is earlier than the second moment.

The first acquisition module 702 is configured to acquire first distance information according to the first measurement value position and the second measurement value position.

The second determination module 703 is configured to determine inertial measurement information and wheel speedometer information of the target vehicle from the first moment to the second moment.

The second acquisition module 704 is configured to acquire second distance information based on the inertial measurement information and the wheel speedometer information.

The third acquisition module 705 is configured to acquire confidence of a target measurement value corresponding to the second moment according to the first distance information and the second distance information.

Optionally, the first acquisition module 702 is further configured to: determine first coordinate data of the first measurement value position in a target rectangular plane coordinate system; determine second coordinate data of the second measurement value position in the target rectangular plane coordinate system; and calculate a horizontal Euclidean distance between the second measurement value position and the first measurement value position according to the first coordinate data and the second coordinate data, to obtain the first distance information.

Optionally, a frame width between the first moment and the second moment includes multiple epochs. The second acquisition module 704 is further configured to: determine attitude update information corresponding to the multiple epochs according to the inertial measurement information; determine speed update information corresponding to the multiple epochs based on the wheel speedometer information and the attitude update information; determine relative displacement from the first moment to the second moment according to the speed update information; and acquire the second distance information according to the relative displacement.

Optionally, the second acquisition module 704 is further configured to: for every adjacent first epoch and second epoch in the multiple epochs, respectively determine first inertial measurement data corresponding to the first epoch and second inertial measurement data corresponding to the second epoch in order according to the inertial measurement information; determine a first angle increment based on the first inertial measurement data, and determine a second angle increment based on the second inertial measurement data; and determine the attitude update information corresponding to the multiple epochs according to the first angle increment and the second angle increment.

Optionally, the second acquisition module 704 is further configured to: acquire first wheel speedometer data corresponding to the first moment; calculate a steering angle of the target vehicle based on the first wheel speedometer data; acquire second wheel speedometer data according to the steering angle, where the second wheel speedometer data is wheel speedometer data corresponding to the first wheel speedometer data in a vehicle body coordinate system; obtain mounting angle data between a vehicle body of the target vehicle and an IMU arranged on the target vehicle according to conversion of the attitude update information; calculate third wheel speedometer data according to the second wheel speedometer data and the mounting angle data, where the third wheel speedometer data is wheel speedometer data in a carrier inertial system; and calculate fourth wheel speedometer data according to wheel speedometer lever-arm error data and the third wheel speedometer data, where the fourth wheel speedometer data is wheel speedometer data in an IMU coordinate system.

Optionally, the first wheel speedometer data includes front left wheel speed, front right wheel speed, rear left wheel speed, and rear right wheel speed. The second acquisition module 704 is further configured to: calculate virtual front wheel speed of the target vehicle according to the front left wheel speed and the front right wheel speed; calculate turning angle speed of the target vehicle according to the rear left wheel speed, the rear right wheel speed, and a tread between a rear left wheel and a rear right wheel of the target vehicle; calculate a turning radius of the target vehicle according to the virtual front wheel speed and the turning angle speed; and calculate the steering angle according to the turning radius and a wheelbase between a front wheel and a rear wheel of the target vehicle.

Optionally, the second acquisition module 704 is further configured to: obtain the relative displacement through recursion according to the fourth wheel speedometer data corresponding to every two adjacent epochs in the multiple epochs.

Optionally, the second acquisition module 704 is further configured to: calculate a horizontal Euclidean distance based on the relative displacement, to obtain the second distance information.

Optionally, the third acquisition module 705 is further configured to: determine a confidence adjustment coefficient of a measurement value according to the first distance information, the second distance information, and the confidence of an initial measurement value corresponding to the second moment; and acquire the confidence of the target measurement value according to the confidence adjustment coefficient of the measurement value and the confidence of the initial measurement value.

It is to be noted that, each of the above modules may be implemented by software or hardware. For the latter, it may be implemented in the following manners, but is not limited to the follow: the above modules are all located in a same processor; or the above modules are located in different processors in any combination.

According to an embodiment of the present disclosure, the present disclosure further provides an electronic device. The electronic device includes a memory and at least one processor. The memory is configured to store at least one computer instruction. The processor is configured to operation the at least one computer instruction to perform steps in the above method embodiments.

Optionally, the electronic device may further include a transmission device and an input or output device. The transmission device is connected with the processor. The input or output device is connected with the processor.

Optionally, in the present disclosure, the processor may be configured to perform the following steps through the computer instruction.

At step S1, a first measurement value position of a positioning component on a target vehicle is determined at a first moment, and a second measurement value position of the positioning component is determined at a second moment. The first moment is earlier than the second moment.

At step S2, first distance information is acquired according to the first measurement value position and the second measurement value position.

At step S3, inertial measurement information and wheel speedometer information of the target vehicle from the first moment to the second moment are determined.

At step S4, second distance information is acquired based on the inertial measurement information and the wheel speedometer information.

At step S5, confidence of a target measurement value corresponding to the second moment is acquired according to the first distance information and the second distance information.

Optionally, for specific examples in this embodiment, refer to the examples described in the foregoing embodiments and the optional implementations, and this embodiment will not be repeated thereto.

According to an embodiment of the present disclosure, the present disclosure further provides a non-transitory computer-readable storage medium storing at least one computer instruction. The non-transitory computer-readable storage medium stores at least one computer instruction. Steps in any of the above method embodiments are performed when the at least one computer instruction is operated.

Optionally, in this embodiment, the non-transitory computer-readable storage medium may be configured to store a computer program for performing the following steps.

At step S1, a first measurement value position of a positioning component on a target vehicle is determined at a first moment, and a second measurement value position of the positioning component is determined at a second moment. The first moment is earlier than the second moment.

At step S2, first distance information is acquired according to the first measurement value position and the second measurement value position.

At step S3, inertial measurement information and wheel speedometer information of the target vehicle from the first moment to the second moment are determined.

At step S4, second distance information is acquired based on the inertial measurement information and the wheel speedometer information.

At step S5, confidence of a target measurement value corresponding to the second moment is acquired according to the first distance information and the second distance information.

Optionally, in this embodiment, the non-transitory computer-readable storage medium may include, but is not limited to, an electronic, magnetic, optical, electromagnetic, infrared, or semiconductor system, device, or apparatus, or any foregoing suitable combinations. More specific examples of the readable storage medium may include electrical connections based on at least one wires, a portable computer disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any above suitable combinations.

According to an embodiment of the present disclosure, the present disclosure further provides a computer program product. Program codes used to implement the audio processing method of the present disclosure can be written in any combination of at least one programming language. These program codes can be provided to the processors or controllers of general computers, special computers, or other programmable data processing devices, so that, when the program codes are performed by the processors or controllers, functions or operations specified in the flowcharts and/or block diagrams are implemented. The program codes can be performed entirely on a machine, partially performed on the machine, and partially performed on the machine and partially performed on a remote machine as an independent software package, or entirely performed on the remote machine or a server.

According to an embodiment of the present disclosure, the present disclosure further provides an autonomous vehicle. The autonomous vehicle includes an electronic device. The electronic device includes a memory and at least one processor. The electronic device may further include a transmission device and an input or output device. The transmission device or the input or output device is connected with the processor.

Optionally, in the present disclosure, the processor may be configured to perform the following steps through the computer instruction.

At step S1, a first measurement value position of a positioning component on a target vehicle is determined at a first moment, and a second measurement value position of the positioning component is determined at a second moment. The first moment is earlier than the second moment.

At step S2, first distance information is acquired according to the first measurement value position and the second measurement value position.

At step S3, inertial measurement information and wheel speedometer information of the target vehicle from the first moment to the second moment are determined.

At step S4, second distance information is acquired based on the inertial measurement information and the wheel speedometer information.

At step S5, confidence of a target measurement value corresponding to the second moment is acquired according to the first distance information and the second distance information.

In the above embodiments of the present disclosure, the description of the embodiments has its own focus. For parts that are not described in detail in a certain embodiment, reference may be made to related descriptions of other embodiments.

In the several embodiments provided in the present disclosure, it should be understood that, the disclosed technical content can be implemented in other ways. The apparatus embodiments described above are illustrative. For example, the division of the units may be a logical function division, and there may be other divisions in actual implementation. For example, multiple units or components may be combined or integrated into another system, or some features can be ignored, or not implemented. In addition, the displayed or discussed mutual coupling or direct coupling or communication connection may be indirect coupling or communication connection through some interfaces, units or modules, and may be in electrical or other forms.

The units described as separate components may or may not be physically separated. The components displayed as units may or may not be physical units, that is, the components may be located in one place, or may be distributed on the multiple units. Part or all of the units may be selected according to actual requirements to achieve the purposes of the solutions of this embodiment.

In addition, the functional units in the various embodiments of the present disclosure may be integrated into one processing unit, or each unit may exist alone physically, or at least two units may be integrated into one unit. The above integrated unit can be implemented in the form of hardware, or can be implemented in the form of a software functional unit.

When the integrated unit is implemented in the form of the software functional unit and sold or used as an independent product, it can be stored in the computer readable storage medium. Based on this understanding, the technical solutions of the present disclosure essentially or the parts that contribute to the prior art, or all or part of the technical solutions can be embodied in the form of a software product. The computer software product is stored in a storage medium, including multiple instructions for causing a computer device (which may be a personal computer, a server, or a network device, and the like) to execute all or part of the steps of the method described in the various embodiments of the present disclosure. The foregoing storage medium includes a USB flash disk, a Read-Only Memory (ROM), a Random Access Memory (RAM), and various media that can store program codes, such as a mobile hard disk, a magnetic disk, or an optical disk.

The above description is exemplary implementations of the present disclosure, and it should be noted that persons of ordinary skill in the art may also make several improvements and refinements without departing from the principle of the present disclosure, and it should be considered that these improvements and refinements shall all fall within the protection scope of the present disclosure.

What is claimed is:

1. A method for obtaining confidence of a measurement value based on multi-sensor fusion, comprising:
   determining a first measurement value position of a positioning component on a target vehicle at a first moment, and determining a second measurement value position of the positioning component at a second moment, wherein the first moment is earlier than the second moment;
   acquiring first distance information according to the first measurement value position and the second measurement value position;
   determining inertial measurement information and wheel speedometer information of the target vehicle from the first moment to the second moment;
   acquiring second distance information based on the inertial measurement information and the wheel speedometer information; and
   acquiring confidence of a target measurement value corresponding to the second moment according to the first distance information and the second distance information;
   wherein a frame width between the first moment and the second moment comprises a plurality of epochs; and acquiring the second distance information based on the inertial measurement information and the wheel speedometer information comprises:
   determining attitude update information corresponding to the plurality of epochs according to the inertial measurement information;
   determining speed update information corresponding to the plurality of epochs based on the wheel speedometer information and the attitude update information;

determining relative displacement from the first moment to the second moment according to the speed update information; and
   wherein determining the speed update information corresponding to the plurality of epochs based on the wheel speedometer information and the attitude update information comprises:
   acquiring first wheel speedometer data corresponding to the first moment;
   calculating a steering angle of the target vehicle based on the first wheel speedometer data;
   acquiring second wheel speedometer data according to the steering angle, wherein the second wheel speedometer data is wheel speedometer data corresponding to the first wheel speedometer data in a vehicle body coordinate system;
   obtaining mounting angle data between a vehicle body of the target vehicle and an Inertial Measurement Unit (IMU) arranged on the target vehicle according to conversion of the attitude update information;
   calculating third wheel speedometer data according to the second wheel speedometer data and the mounting angle data, wherein the third wheel speedometer data is wheel speedometer data in a carrier inertial system; and
   calculating fourth wheel speedometer data according to wheel speedometer lever-arm error data and the third wheel speedometer data, wherein the fourth wheel speedometer data is wheel speedometer data in an IMU coordinate system;
   wherein determining the relative displacement from the first moment to the second moment according to the speed update information comprises:
   obtaining the relative displacement through recursion according to the fourth wheel speedometer data corresponding to every two adjacent epochs in the plurality of epochs;
   the confidence of the target measurement value is configured to predict the target vehicle's state with the positioning system, the result of the positioning system's prediction of the target vehicle's state is used for the autonomous driving of the target vehicle.

2. The method as claimed in claim 1, wherein acquiring the first distance information according to the first measurement value position and the second measurement value position comprises:
   determining first coordinate data of the first measurement value position in a target rectangular plane coordinate system;
   determining second coordinate data of the second measurement value position in the target rectangular plane coordinate system; and
   calculating a horizontal Euclidean distance between the second measurement value position and the first measurement value position according to the first coordinate data and the second coordinate data, to obtain the first distance information.

3. The method as claimed in claim 1, wherein acquiring the second distance information based on the inertial measurement information and the wheel speedometer information comprises:
   acquiring the second distance information according to the relative displacement.

4. The method as claimed in claim 1, wherein determining the attitude update information corresponding to the plurality of epochs according to the inertial measurement information comprises:

for every adjacent first epoch and second epoch in the plurality of epochs, respectively determining first inertial measurement data corresponding to the first epoch and second inertial measurement data corresponding to the second epoch in order according to the inertial measurement information;

determining a first angle increment based on the first inertial measurement data, and determining a second angle increment based on the second inertial measurement data; and determining the attitude update information corresponding to the plurality of epochs according to the first angle increment and the second angle increment.

5. The method as claimed in claim 1, wherein the first wheel speedometer data comprises front left wheel speed, front right wheel speed, rear left wheel speed, and rear right wheel speed; and calculating the steering angle based on the first wheel speedometer data comprises:

calculating virtual front wheel speed of the target vehicle according to the front left wheel speed and the front right wheel speed;

calculating turning angle speed of the target vehicle according to the rear left wheel speed, the rear right wheel speed, and a tread between a rear left wheel and a rear right wheel of the target vehicle;

calculating a turning radius of the target vehicle according to the virtual front wheel speed and the turning angle speed; and calculating the steering angle according to the turning radius and a wheelbase between a front wheel and a rear wheel of the target vehicle.

6. The method as claimed in claim 1, wherein acquiring the second distance information according to the relative displacement comprises:

calculating a horizontal Euclidean distance based on the relative displacement, to obtain the second distance information.

7. The method as claimed in claim 1, wherein acquiring the confidence of the target measurement value according to the first distance information and the second distance information comprises:

determining a confidence adjustment coefficient of a measurement value according to the fist distance information, the second distance information, and a confidence of an initial measurement value corresponding to the second moment; and acquiring the confidence of the target measurement value according to confidence adjustment coefficient of the measurement value and the confidence of the initial measurement value.

8. An electronic device, comprising:

at least one processor, and a memory, communicatively connected with the at least one processor, wherein the memory is configured to store at least one instruction executable by the at least one processor, and the at least one instruction is performed by the at least one processor, to cause the at least one processor to perform the following steps:

determining a first measurement value position of a positioning component on a target vehicle at a first moment, and determining a second measurement value position of the positioning component at a second moment, wherein the first moment is earlier than the second moment;

acquiring first distance information according to the first measurement value position and the second measurement value position;

determining inertial measurement information and wheel speedometer information of the target vehicle from the first moment to the second moment;

acquiring second distance information based on the inertial measurement information and the wheel speedometer information; and acquiring confidence of a target measurement value corresponding to the second moment according to the first distance information and the second distance information, wherein a frame width between the first moment and the second moment comprises a plurality of epochs; and acquiring the second distance information based on the inertial measurement information and the wheel speedometer information comprises:

determining attitude update information corresponding to the plurality of epochs according to the inertial measurement information;

determining speed update information corresponding to the plurality of epochs based on the wheel speedometer information and the attitude update information;

determining relative displacement from the first moment to the second moment according to the speed update information; and wherein determining the speed update information corresponding to the plurality of epochs based on the wheel speedometer information and the attitude update information comprises:

acquiring first wheel speedometer data corresponding to the first moment;

calculating a steering angle of the target vehicle based on the first wheel speedometer data;

acquiring second wheel speedometer data according to the steering angle, wherein the second wheel speedometer data is wheel speedometer data corresponding to the first wheel speedometer data in a vehicle body coordinate system;

obtaining mounting angle data between a vehicle body of the target vehicle and an Inertial Measurement Unit (IMU) arranged on the target vehicle according to conversion of the attitude update information;

calculating third wheel speedometer data according to the second wheel speedometer data and the mounting angle data, wherein the third wheel speedometer data is wheel speedometer data in a carrier inertial system; and calculating fourth wheel speedometer data according to wheel speedometer lever-arm error data and the third wheel speedometer data, wherein the fourth wheel speedometer data is wheel speedometer data in an IMU coordinate system;

wherein determining the relative displacement from the first moment to the second moment according to the speed update information comprises:

obtaining the relative displacement through recursion according to the fourth wheel speedometer data corresponding to every two adjacent epochs in the plurality of epochs;

the confidence of the target measurement value is configured to predict the target vehicle's state with the positioning system, the result of the positioning system's prediction of the target vehicle's state is used for the autonomous driving of the target vehicle.

9. The electronic device as claimed in claim 8, wherein acquiring the first distance information according to the first measurement value position and the second measurement value position comprises:

determining first coordinate data of the first measurement value position in a target rectangular plane coordinate system;

determining second coordinate data of the second measurement value position in the target rectangular plane coordinate system; and calculating a horizontal Euclidean distance between the second measurement value position and the first measurement value position according to the first coordinate data and the second coordinate data, to obtain the first distance information.

10. The electronic device as claimed in claim 8, wherein acquiring the second distance information based on the inertial measurement information and the wheel speedometer information comprises:

acquiring the second distance information according to the relative displacement.

11. The electronic device as claimed in claim 8, wherein determining the attitude update information corresponding to the plurality of epochs according to the inertial measurement information comprises:

for every adjacent first epoch and second epoch in the plurality of epochs, respectively determining first inertial measurement data corresponding to the first epoch and second inertial measurement data corresponding to the second epoch in order according to the inertial measurement information;

determining a first angle increment based on the first inertial measurement data, and determining a second angle increment based on the second inertial measurement data; and determining the attitude update information corresponding to the plurality of epochs according to the first angle increment and the second angle increment.

12. The electronic device as claimed in claim 8, wherein the first wheel speedometer data comprises front left wheel speed, front right wheel speed, rear left wheel speed, and rear right wheel speed; and calculating the steering angle based on the first wheel speedometer data comprises:

calculating virtual front wheel speed of the target vehicle according to the front left wheel speed and the front right wheel speed;

calculating turning angle speed of the target vehicle according to the rear left wheel speed, the rear right wheel speed, and a tread between a rear left wheel and a rear right wheel of the target vehicle;

calculating a turning radius of the target vehicle according to the virtual front wheel speed and the turning angle speed; and calculating the steering angle according to the turning radius and a wheelbase between a front wheel and a rear wheel of the target vehicle.

13. The electronic device as claimed in claim 8, wherein acquiring the second distance information according to the relative displacement comprises:

calculating a horizontal Euclidean distance based on the relative displacement, to obtain the second distance information.

14. The electronic device as claimed in claim 8, wherein acquiring the confidence of the target measurement value according to the first distance information and the second distance information comprises:

determining a confidence adjustment coefficient of a measurement value according to the first distance information, the second distance information, and a confidence of an initial measurement value corresponding to the second moment; and acquiring the confidence of the target measurement value according to confidence adjustment coefficient of the measurement value and the confidence of the initial measurement value.

15. A non-transitory computer readable storage medium, storing at least one computer instruction, wherein the at least one computer instruction is used for a computer to perform the following steps:

determining a first measurement value position of a positioning component on a target vehicle at a first moment, and determining a second measurement value position of the positioning component at a second moment, wherein the first moment is earlier than the second moment;

acquiring first distance information according to the first measurement value position and the second measurement value position;

determining inertial measurement information and wheel speedometer information of the target vehicle from the first moment to the second moment;

acquiring second distance information based on the inertial measurement information and the wheel speedometer information; and acquiring confidence of a target measurement value corresponding to the second moment according to the first distance information and the second distance information;

wherein a frame width between the first moment and the second moment comprises a plurality of epochs; and acquiring the second distance information based on the inertial measurement information and the wheel speedometer information comprises:

determining attitude update information corresponding to the plurality of epochs according to the inertial measurement information;

determining speed update information corresponding to the plurality of epochs based on the wheel speedometer information and the attitude update information;

determining relative displacement from the first moment to the second moment according to the speed update information; and wherein determining the speed update information corresponding to the plurality of epochs based on the wheel speedometer information and the attitude update information comprises:

acquiring first wheel speedometer data corresponding to the first moment;

calculating a steering angle of the target vehicle based on the first wheel speedometer data;

acquiring second wheel speedometer data according to the steering angle, wherein the second wheel speedometer data is wheel speedometer data corresponding to the first wheel speedometer data in a vehicle body coordinate system;

obtaining mounting angle data between a vehicle body of the target vehicle and an Inertial Measurement Unit (IMU) arranged on the target vehicle according to conversion of the attitude update information;

calculating third wheel speedometer data according to the second wheel speedometer data and the mounting angle data, wherein the third wheel speedometer data is wheel speedometer data in a carrier inertial system; and calculating fourth wheel speedometer data according to wheel speedometer lever-arm error data and the third wheel speedometer data, wherein the fourth wheel speedometer data is wheel speedometer data in an IMU coordinate system;

wherein determining the relative displacement from the first moment to the second moment according to the speed update information comprises:

obtaining the relative displacement through recursion according to the fourth wheel speedometer data corresponding to every two adjacent epochs in the plurality of epochs;

the confidence of the target measurement value is configured to predict the target vehicle's state with the positioning system, the result of the positioning system's prediction of the target vehicle's state is used for the autonomous driving of the target vehicle.

16. The non-transitory computer readable storage medium as claimed in claim 15, wherein acquiring the second distance information based on the inertial measurement information and the wheel speedometer information comprises:

acquiring the second distance information according to the relative displacement.

* * * * *